M. H. CLARK.
MACHINE FOR APPLYING SAMPLES TO CARDS.
APPLICATION FILED NOV. 17, 1915.
1,304,943.
Patented May 27, 1919.
9 SHEETS—SHEET 4.
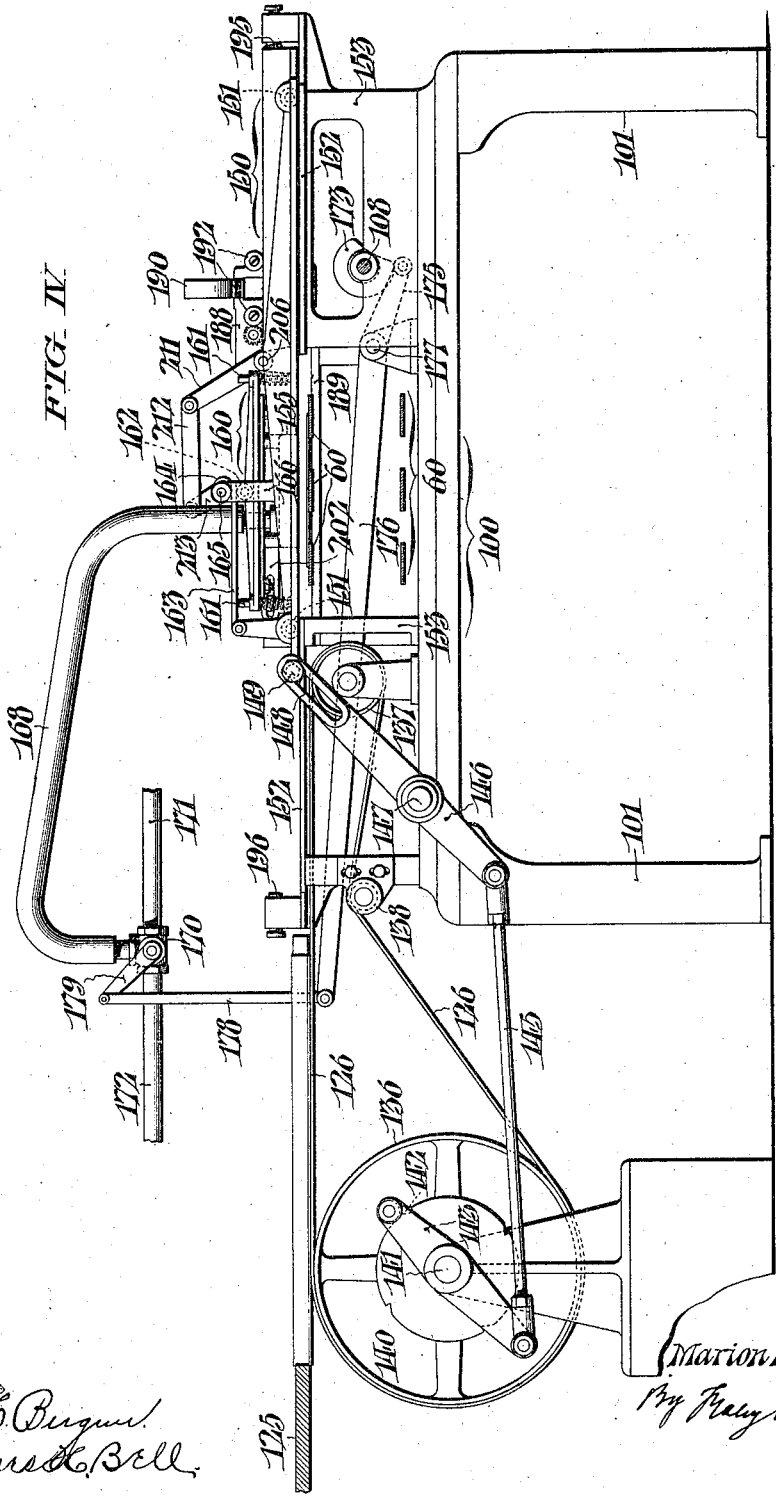

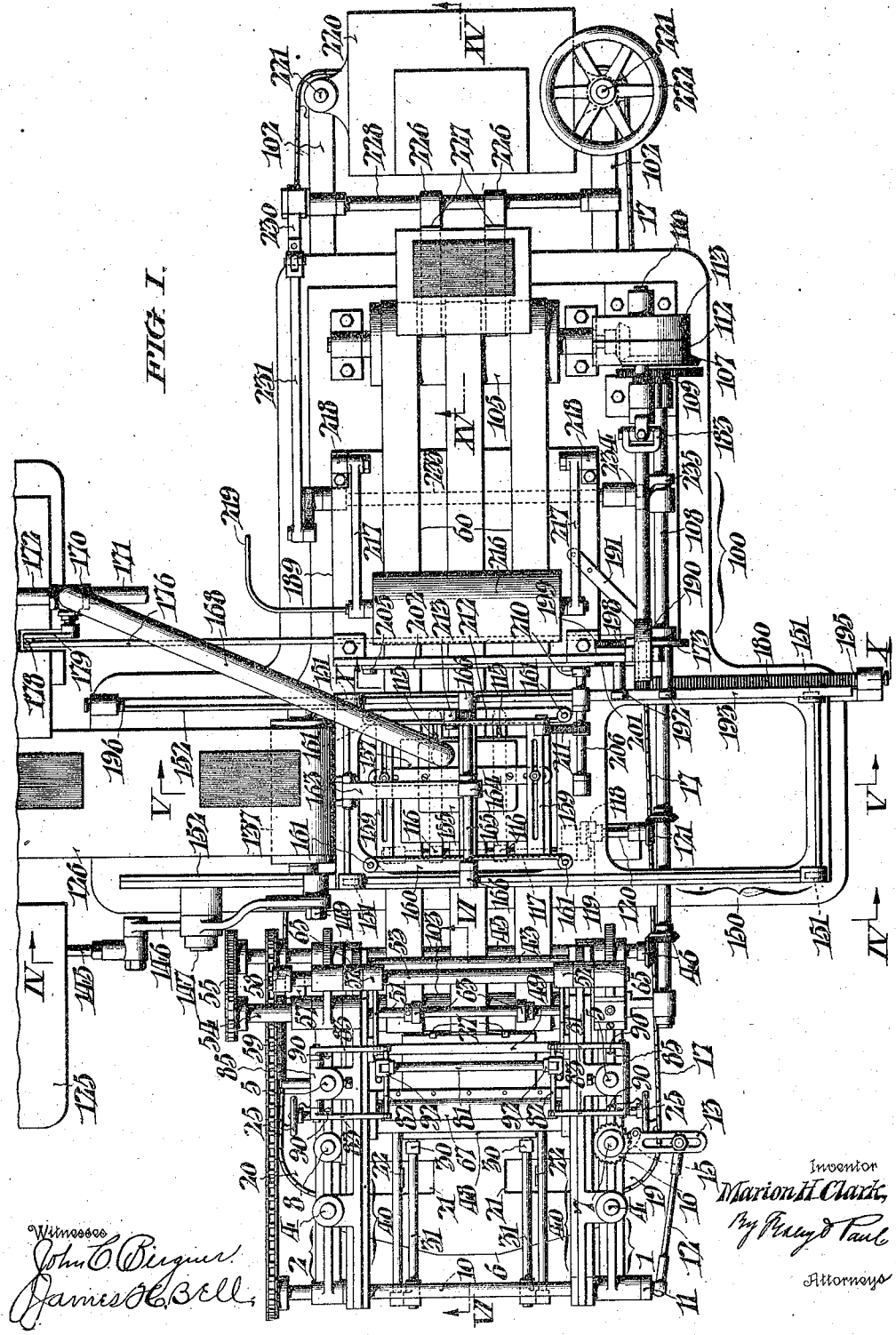

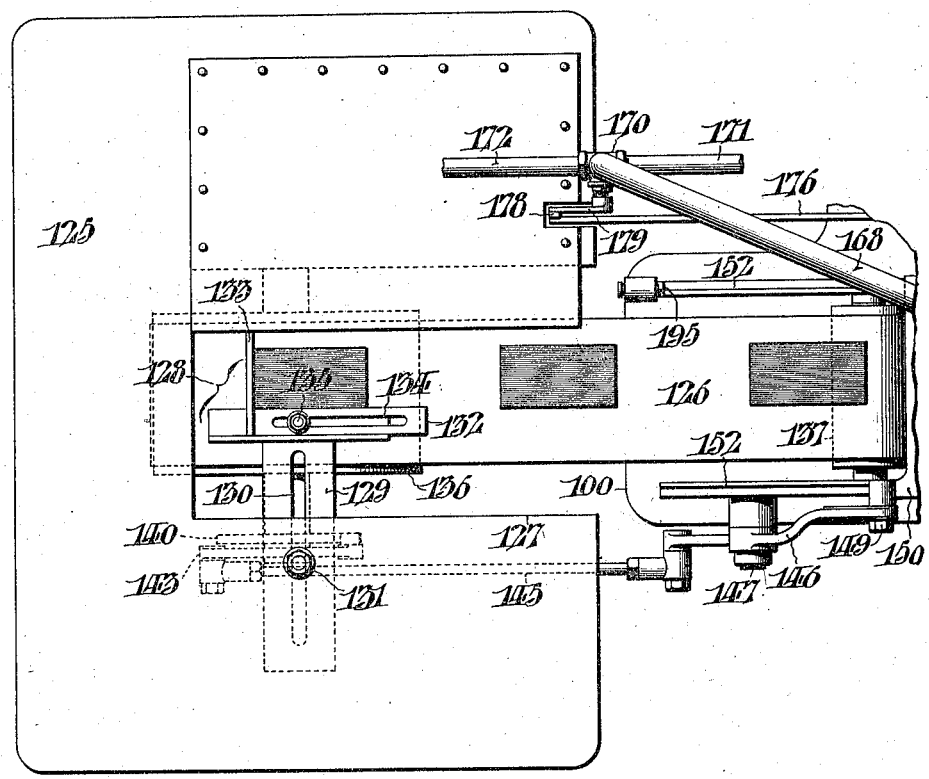
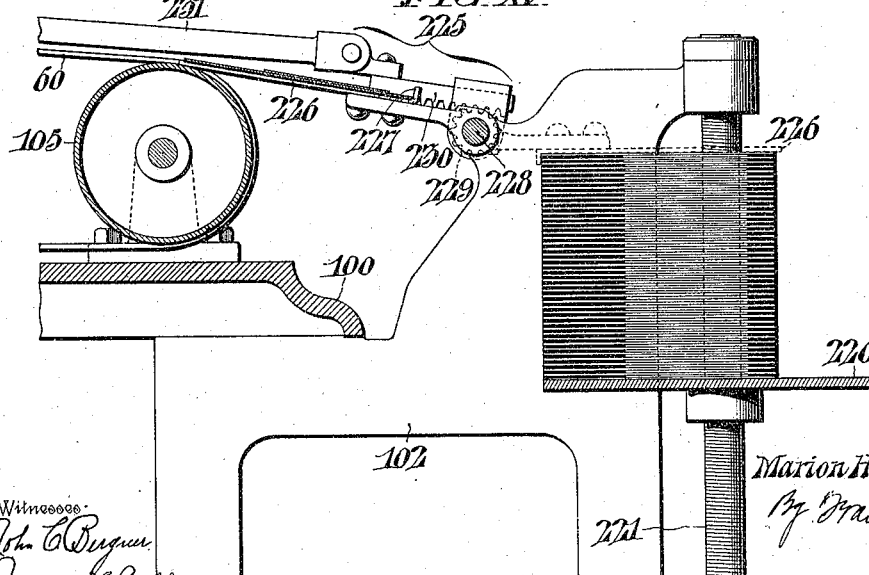

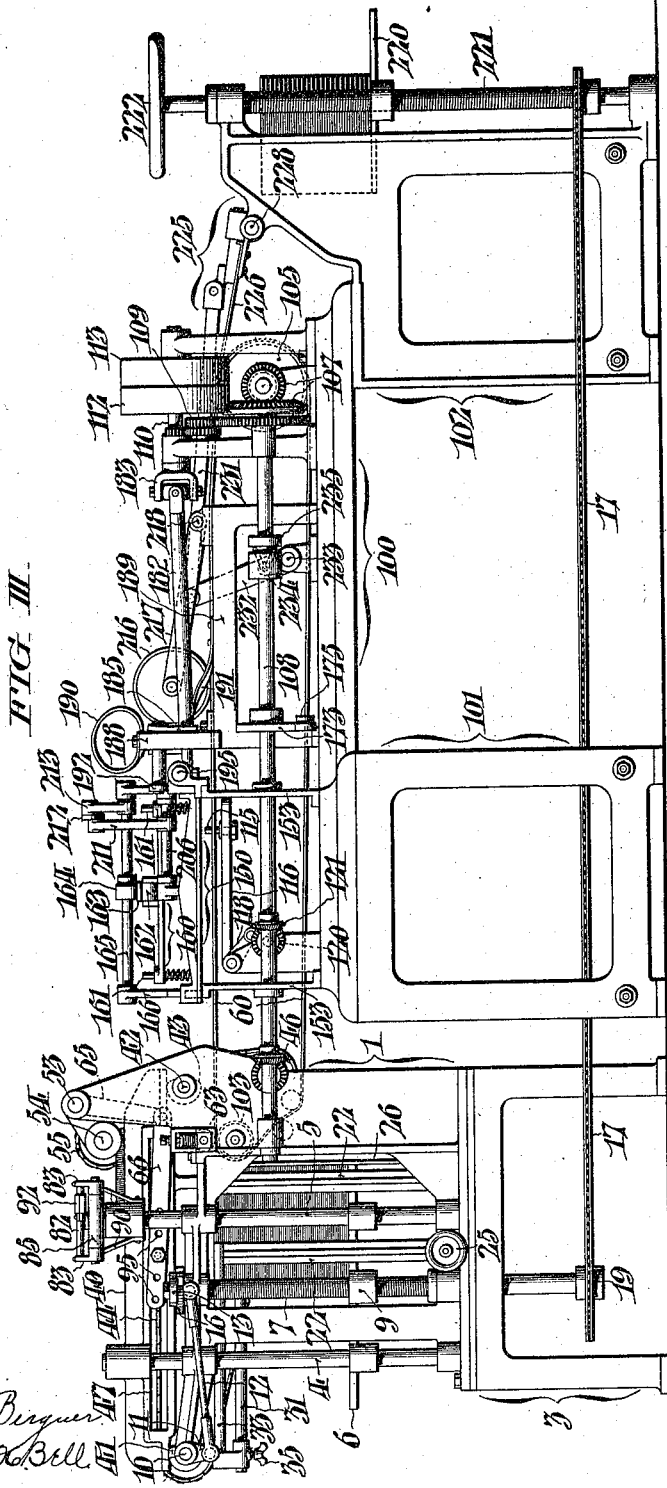

M. H. CLARK.
MACHINE FOR APPLYING SAMPLES TO CARDS.
APPLICATION FILED NOV. 17, 1915.
1,304,943.
Patented May 27, 1919.
9 SHEETS—SHEET 5.
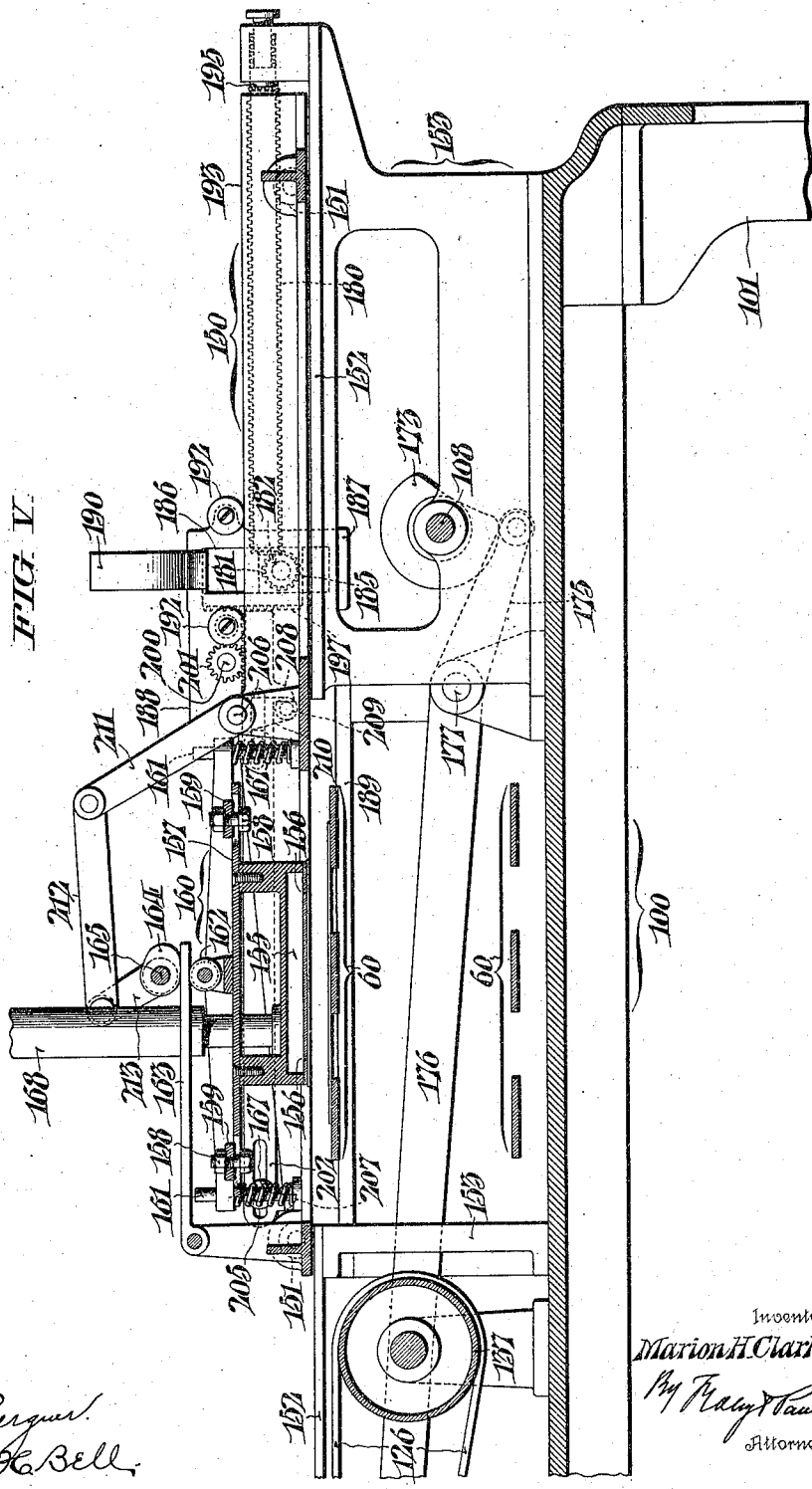

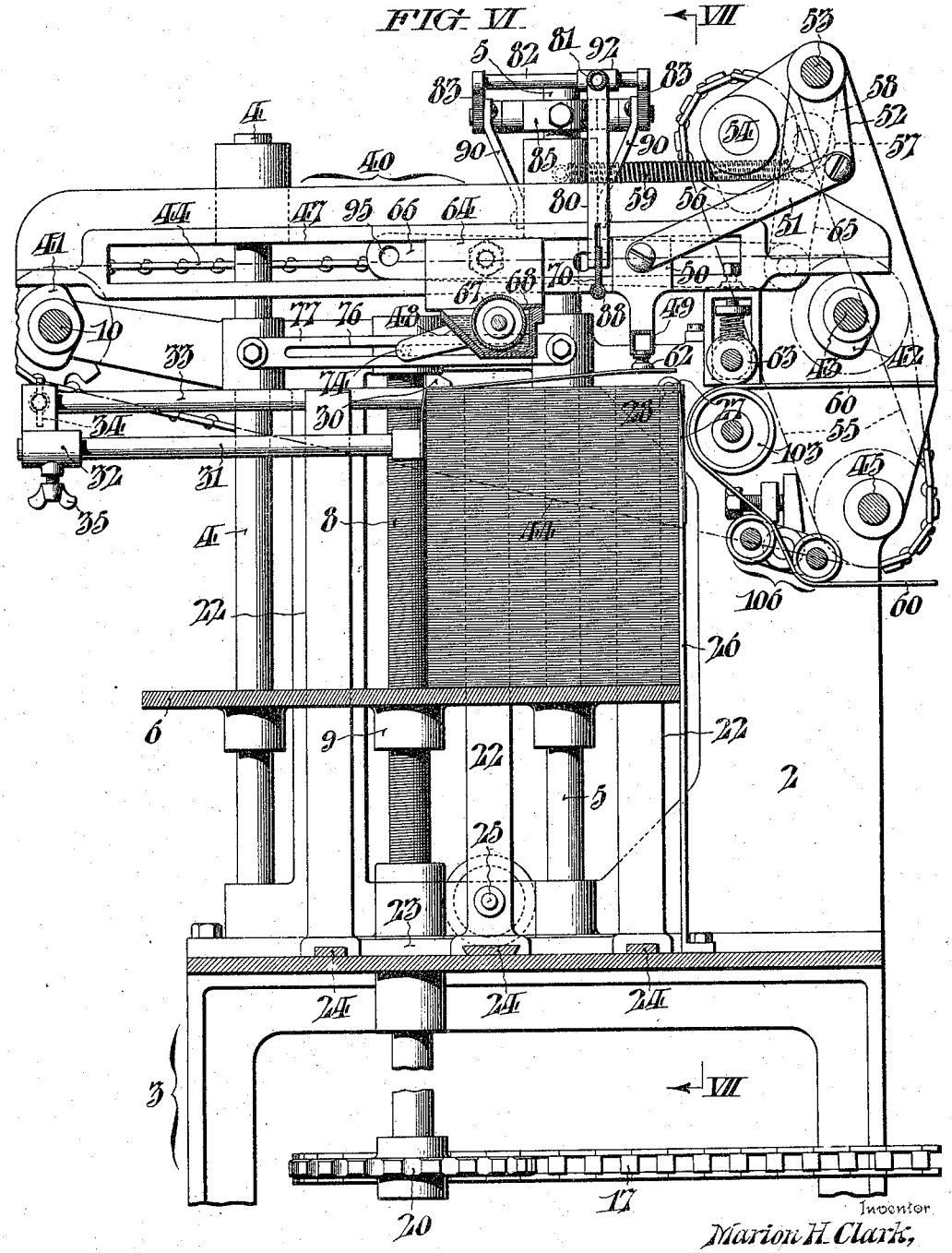

M. H. CLARK.
MACHINE FOR APPLYING SAMPLES TO CARDS.
APPLICATION FILED NOV. 17, 1915.
1,304,943.
Patented May 27, 1919.
9 SHEETS—SHEET 7.
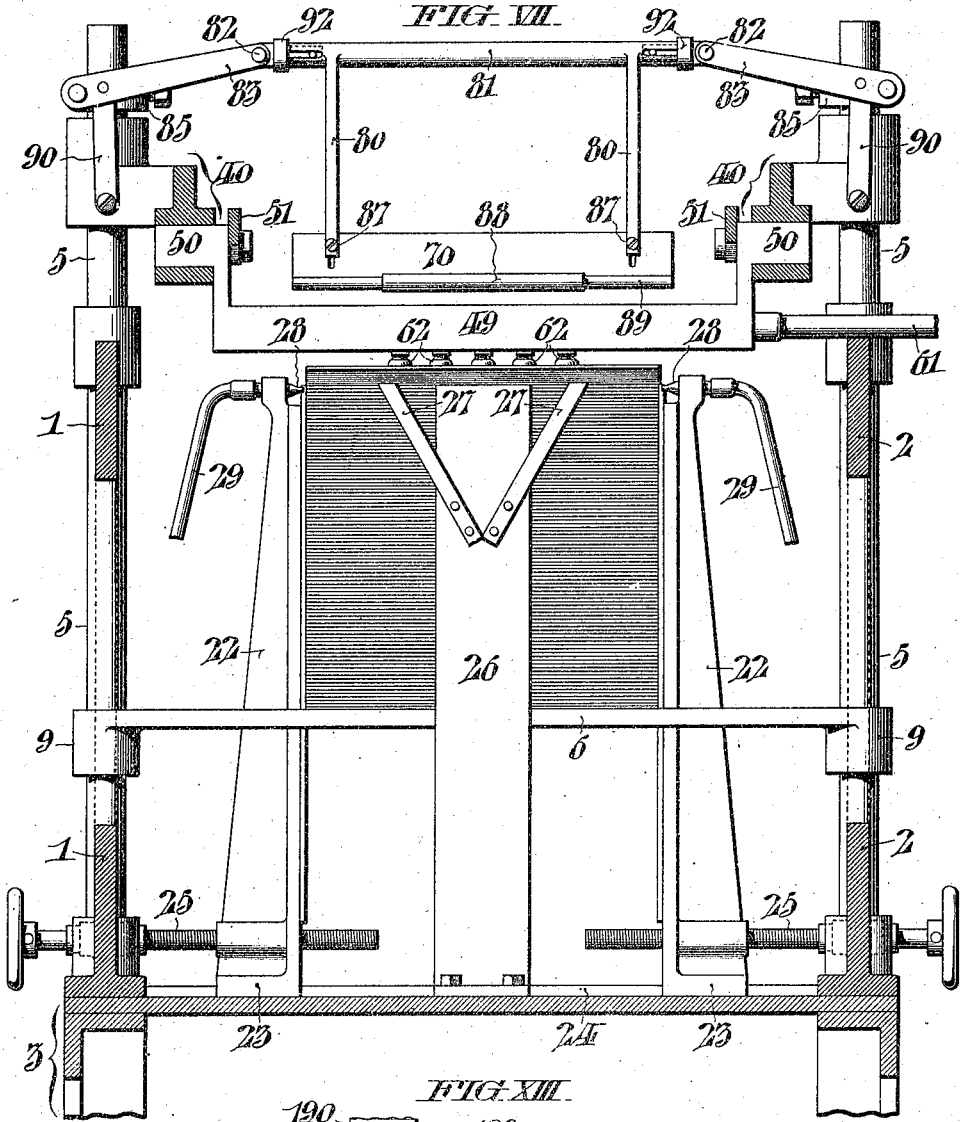
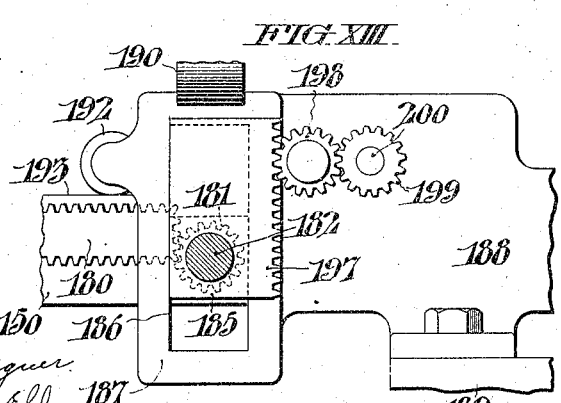

M. H. CLARK.
MACHINE FOR APPLYING SAMPLES TO CARDS.
APPLICATION FILED NOV. 17, 1915.
1,304,943.
Patented May 27, 1919.
9 SHEETS—SHEET 8.
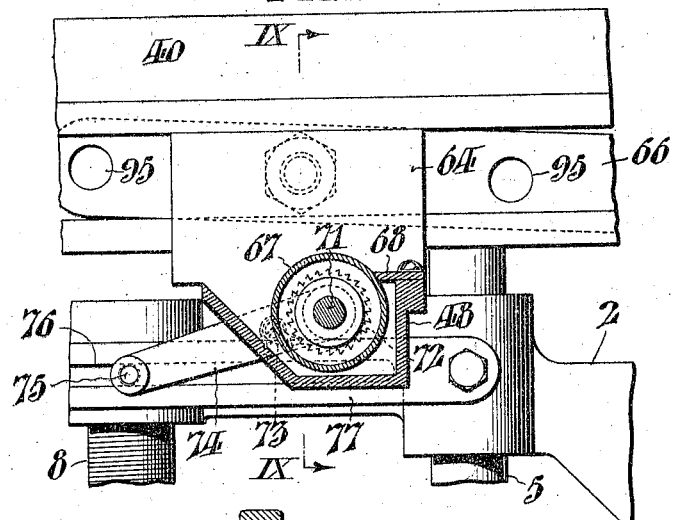
FIG. VIII.
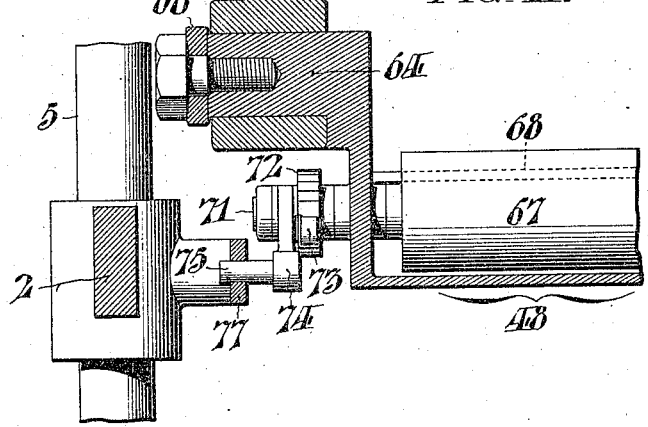
FIG. IX.
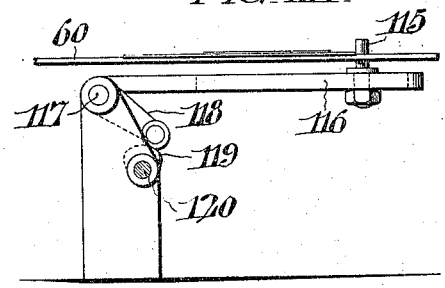
FIG. XIV.
Inventor
Marion H. Clark,
By Raley & Paul
Attorneys
Witnesses
John C. Bergner
James E. Bell M. H. CLARK.
MACHINE FOR APPLYING SAMPLES TO CARDS.
APPLICATION FILED NOV. 17, 1915.
1,304,943.
Patented May 27, 1919.
9 SHEETS—SHEET 9.
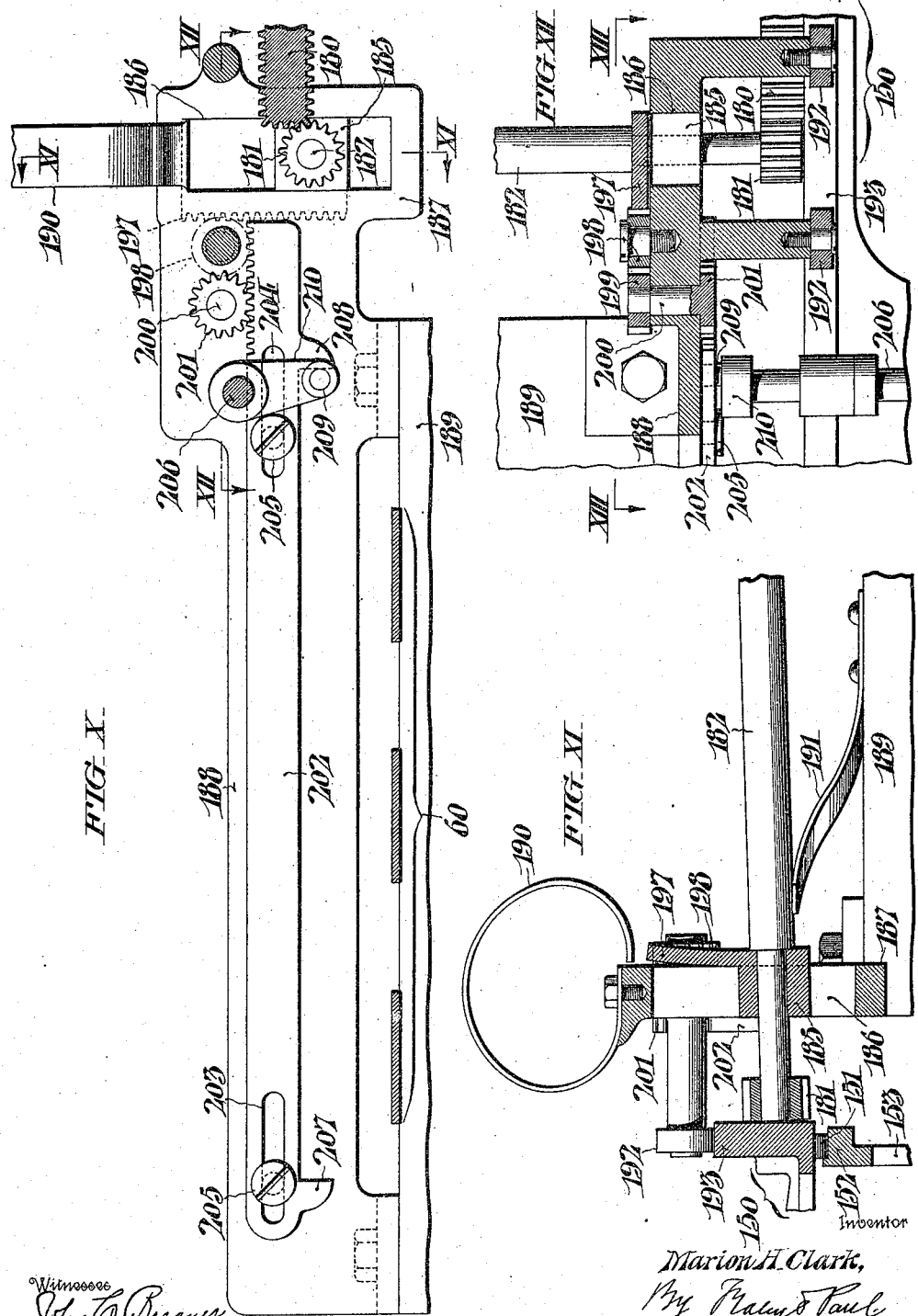

UNITED STATES PATENT OFFICE.

MARION H. CLARK, OF PHILADELPHIA, PENNSYLVANIA.

MACHINE FOR APPLYING SAMPLES TO CARDS.

1,304,943.  Specification of Letters Patent.  Patented May 27, 1919.

Application filed November 17, 1915. Serial No. 62,072.

*To all whom it may concern:*

Be it known that I, MARION H. CLARK, of Philadelphia, in the county of Philadelphia and State of Pennsylvania, have invented certain new and useful Improvements in Machines for Applying Samples to Cards, whereof the following is a specification, reference being had to the accompanying drawings.

The invention relates to new and useful improvements in machines for applying samples to cards, and more particularly to the securing of fabric samples to cards.

An object of the invention is to provide a machine of the above character wherein the cards may be taken one after another from a stack, the samples attached thereto in predetermined relation to the card, after which the card with the samples applied are restacked.

A further object of the invention is to provide a machine for applying the samples to the cards wherein the cards to receive the samples are taken one after another from the stack, and means is provided for maintaining the stack with the uppermost card at the same level.

A further object of the invention is to provide a machine of the above character with means for applying adhesive to the card while in the stack and prior to the removal of the card from the stack.

A still further object of the invention is to provide a machine of the above character with means for separating the topmost card from the stack to facilitate the removal therefrom, and with means also for maintaining the card until it is forcibly removed from the stack.

A still further object of the invention is to provide a machine for applying samples to cards wherein the cards are fed one after another by a continuously traveling conveyer, the cards being arrested on the conveyer while a sample is being applied thereto.

A still further object of the invention is to provide a machine of the above character with means for applying an adhesive to the card prior to the placing of the sample thereon, and with means for pressing the sample against the card after it has been placed thereon.

These and other objects will in part be obvious, and will in part be hereinafter more fully disclosed.

In the accompanying drawings, which show by way of illustration one embodiment of the invention, Figure I, is a plan view of a machine embodying my improvements, a portion of the sample feeding table being broken away for convenience of illustration.

Fig. II, is a detail plan view of the sample feeding table.

Fig. III, illustrates a side elevation of the device as seen from the bottom of Fig. I.

Fig. IV, is a cross section taken on the line IV, IV, of Fig. I.

Fig. V, is a sectional view taken on the line V, V, of Fig. I.

Fig. VI, is a longitudinal section through the card feeding section of the machine and as indicated by the arrows VI, VI, of Fig. I.

Fig. VII, is a cross sectional view through the same taken on the line VII, VII, of Fig. VI.

Fig. VIII, illustrates a detail cross sectional view through the reciprocating glue trough.

Fig. IX, is another detail sectional view of the same, its plane being indicated by the arrows IX, IX, of Fig. VIII.

Fig. X, is a fragmentary sectional view taken on the line X, X, of Fig. I, illustrating the mechanism controlling the movements of the transfer carriage for the samples.

Figs. XI, and XII, are further detail sectional views of this mechanism, their respective planes being designated by the arrows XI, XI, and XII, XII, in Fig. X.

Fig. XIII, is a fragmentary sectional view taken on the line XIII, XIII, of Fig. XII.

Fig. XIV, illustrates the method of arresting the motion of a backing card during the application of the sample thereto, and Fig. XV, is a detail sectional view taken on the line XV, XV, of Fig. I, showing the mechanism for stacking the cards with the attached samples.

The invention consists broadly in a stack holding means for the cards to which the samples are to be applied, a conveyer for conveying the cards to the position where the samples are attached thereto and for feeding the cards to the discharge end of the machine after the samples have been attached, where said cards with the samples applied are again restacked. An adhesive is applied to the cards while in the stack at the receiving end of the machine, and after the adhesive has been applied the cards are removed and presented to the conveyer. Means is provided for maintaining the topmost card of the stack to the receiving end of the machine substantially at the same level. This facilitates the applying of the adhesive and the removing of the part from the stack. Means is also provided for separating the topmost card from the stack to facilitate its removal, and means for retaining the card after it is separated until it is forcibly removed from the retainers and placed on the conveyer by the removable vacuum pad. The conveyer for the cards travels continuously and the cards are arrested on the conveyer at the sample applying station by suitable retaining fingers which engage the cards and hold the same while the conveyer slides underneath said card. The samples are fed by a conveyer intermittently traveling and arranged at right angles to the card conveyer. The intermittent movement of the conveyer permits the samples to be placed on the conveyer while at rest and this places the samples in a predetermined relation to the conveyer. The samples are removed from the conveyer by a reciprocating carriage which is provided with suction means for lifting the sample and pressure means for stripping the sample from the carriage. The carriage is moved over the sample conveyer and is brought to dwell while the sample is being lifted from the conveyer. It is then moved to a predetermined position over the arrested card and is stripped from the carriage by air pressure. After the sample has been properly placed in a predetermined position on the card, the fingers release the card and the card with the sample applied passes underneath a heated roller which secures the sample to the card. The cards with the samples applied are then restacked and the table receiving the stack is intermittently lowered to permit the stack to form.

Referring more in detail to the drawings, I will first describe the card feeding and adhesive applying mechanism, then the sample feeding and applying mechanism and finally the restacking mechanism.

*1. The card feeding and adhesive applying mechanism.*

Referring more particularly to Figs. I, III, VI, and VII, this portion of the machine comprises the side standards 1, and 2, rigidly supported upon a framework 3. Fixed within integral bosses of the standards are the paired guide rods 4—5, 4—5, for the vertically movable table or stack holder 6, upon which the backing cards are stacked. This table or stack holder is raised step by step by a pair of feed screws 7, and 8, which are threaded into bosses 9—9, integrally formed with the said table.

An intermittent rotary motion is imparted to the feed screw 7, by a pawl and ratchet device operated from a shaft 10, by means of a crank 11, fixed thereto. A link 12, serves to connect the crank with an oscillating arm 13, loosely mounted about the top of the feed screw 7. The motion of the said arm is transmitted through a pawl 15, to a ratchet wheel 16, rigidly secured to the said screw. The intermittent motion thus imparted to the screw 7, is simultaneously transmitted to the screw 8, by means of a chain 17, passing about the respective sprocket wheels 19, and 20, and ultimately results in elevating the table 6, vertically in increments corresponding to the thickness of the backing cards, the uppermost one of the stack being thereby constantly maintained at the same level and presented in readiness to be advanced to the conveyer, in a manner to be later described.

As seen in Fig. I, the table 6, is partially slotted transversely at either side as at 21, 21, to permit the movement of the vertical gage, or limiting uprights 22, of which there are three upon each side of this portion of the machine. These groups are integrally formed with crossheads 23, adapted to be shifted across the top plate of the framework 3, under guidance of ridges 24, by means of adjusting screws 25, rotatably mounted in the side frames 1, and 2. By the proper shifting of these gages, the table 6, may be adapted for holding cards of various widths, and these gages are further functional in guiding the stack during the upward motion of the table.

A stationary vertical stop 26, coöperates with the side gages and serves to properly fix the position of the cards upon the table 6, with respect to the operative parts of this portion of the machine.

In order to insure the feeding of but a single card at a time, spring fingers 27, 27, are provided. These are attached to the stationary stop 26, and are bent slightly rearward and provided at their free ends with comparatively short lateral extensions (see Fig. VI), which overlap the uppermost card of the stack. These fingers yield readily when the forward edge of a card is lifted as shown in Fig. VI, but return instantly thereafter to their normal position, thereby retaining the next succeeding card in the stack, and preventing multiple feeding.

As a further safeguard to prevent this multiple feeding in the event of adherence due to static electrification, I have provided a compressed air jet 28, at each side of the card stack. These jets may be secured to one of the uprights of the side gages and connected by flexible conduits 29, to any convenient source of compressed air. They are located in close proximity to the forward edges of the cards and are directed to impinge at a point between the two upper cards of the stack (see Fig. VI), thereby effectively separating them. In order to prevent displacement of the cards under the force of the air jets just described, I have provided holders 30, which are mounted upon the ends of rods 31, slidably secured within bosses 32, swivelly connected to rearward extensions 33, of the side gages. Winged nuts 34, 35, serve to permit and fix the proper adjustment of the holders, both horizontally and vertically, according to cards of various widths.

The cards are lifted from the stack and advanced to the conveyer 60, by the mechanism about to be described.

As shown in Fig. III, the rods 4—4, and 5—5, are somewhat extended above the top of the side frames 1, and 2, and are further functional in serving as guides for the supporting members 40—40, which rest in contact with cams 41—41, and 42—42, one pair of which is mounted upon the lateral shaft 10, already mentioned, while the other pair of which is mounted upon a companion shaft 43. The shafts 10, and 43, are constantly driven by means of a sprocket chain 44, from the driving shaft 45, so that under the influence of the cams 41, and 42, the members 40—40, and the parts supported thereby, are raised and depressed with respect to the card stack. Shaft 45, is driven by means of bevel gears 46, from the main drive shaft 108, (see Fig. III.)

The members 40, are slotted as indicated at 47, to provide slideways for the glue or adhesive trough 48, and the vacuum duct 49. This duct is suspended from a pair of blocks 50, mounted in the slideways of the members 40, and adapted to be shifted longitudinally therein by means of links 51, which are pivotally attached to arms 52, fixed upon a rock shaft 53. A stud shaft 54, driven by means of a sprocket chain 55, from the drive shaft 45, carries a cam 56, which through a roller 57, mounted on the end of an arm 58, is instrumental in causing the oscillation of the rock shaft 53. A spring 59, serves to maintain the roller 57, in contact with its coöperating cam.

The vacuum duct 49, may be connected by means of a flexible tube 61, (Fig. VII), with a suitable pump (not shown), and comprises a series of suction cups 62, adapted to engage the uppermost card of the stack and lift its forward end, and thereafter present it to the conveyer 60. It will be noted that the motion of the duct is a compound one, i. e., first a vertical motion, due to its mounting in the supporting member 40, and secondly, a horizontal reciprocation due to its connections with the rock shaft 53.

After being sufficiently advanced as above noted, the card is finally engaged by the nip roll which comprises a pair of spaced collars 63, 63, which are spring-pressed against the conveyer 60, so that the card is positively pulled forward and thereafter moved to a position in readiness to receive its sample as will be more definitely hereinafter described.

The glue trough 48, extends between the members 40, and is suspended from integrally formed slide blocks 64, received in the slideway 47, and also adapted for horizontal reciprocation under the influence of rock shaft 53, whose fixed arms 65, are connected with the said trough by means of the links 66. Mounted within the trough is a roller 67, which is partially submerged in the glue, as shown, in Fig. VI. A scraper 68, serves to maintain a uniform film of glue upon the exposed portion of the roll, which is adapted to be engaged by the printing bar 70, when the trough is bodily reciprocated as above described.

In order to constantly expose a fresh film of glue, the roller 67, is adapted to be intermittently rotated by a pawl and ratchet arrangement, best illustrated in Figs. VIII and IX. The shaft 71, upon which the roller is mounted, is extended beyond the trough to afford attachment for a ratchet wheel 72, which is actuated by a spring-pressed pawl 73, carried by an arm 74, loosely mounted above the said shaft. A pin 75, in the outer end of the arm 74, is in sliding engagement with a slot 76, formed in a plate 77, rigidly attached to the standard 2. It will be readily understood that the vertical motion of the glue trough results in the oscillation of the arm 74, and by the intervening translating elements ultimately causes the intermittent rotation of the glue roller 67.

The printing bar 70, is suspended from the ends of the depending arms 80, of a sleeve 81, supported with the interposition of pivotal connections by arms 83, which are in turn pivotally attached to fixed collars 85, upon the upper ends of the guide rods 5—5, for the card feeding table. Slotted connections 87, between the printing bar and its supporting arms permit the requisite amount of lost motion to afford a wiping contact of the said bar with the glue roller 67, during the raised or inactive position of the bar. The contacting surface of the bar is in the form of a clip 88, which is adapted to be sprung about the bead 89, of the bar, in such a manner as to be readily detachable. These facing clips determine the length of the imprint of the glue applied to the cards and are accordingly made in varying lengths and may be interchanged to correspond to the size of the particular samples which are to be affixed to the cards.

After the bar 70, has received its charge of glue, it is lowered into contact with the uppermost card of the stack, whereby its charge is deposited or imprinted. This motion is brought about through links 90, which are connected at one end to the arms 83, and at the other to the vertically moving members 40, as best seen in Fig. VII, so that the application of the glue to the cards takes place simultaneously with the depression of the vacuum duct, and it may be noted in this connection, that the various parts of the machine are so timed that these operations are completed before the card is shifted to the conveyer. It will also be noted that the proportioning of these parts is such that the vertical motion of the printing bar is greatly in excess of that of the vacuum duct, so that when raised, the said bar is entirely clear of the card, while it is being advanced horizontally to the conveyer.

In order that the point of application of the glue with respect to the forward edge of the card may be varied, the arms 80, by which the printing bar is suspended may be longitudinally shifted in the following manner:—the points of attachment of the supporting sleeve with the arms are in the form of slidable collars 92, which may be shifted along the pivot rods 82, which are spanned between the paired arms 83. In order to permit this adjustment, a corresponding adjustment of the position of the glue trough is also necessary and this is afforded by a series of apertures 95, in the links 66, so that the point of pivotal attachment of the trough to these links may be varied without incurring any changes in the actuating mechanism therefor. The extensive slot 76, in the plate 77, of the mechanism for intermittently rotating the glue roller is also functional in permitting this adjustment.

*2. The sample feeding and applying mechanism.*

This portion of the machine finds its support in a bed plate 100, which is mounted adjacent the card feeding mechanism upon end frames 101, and 102, as best seen in Fig. III. The conveyer 60, already referred to, comprises three separate spaced bands and at one end of the machine passes about an idler pulley 103, suitably journaled in the side standards of the card feeding mechanism, while at the other end of the machine, the said conveyer passes over a pulley 105, which serves as a drive therefor. An adjustable slack take-up 106, is interposed in the path of this conveyer, at a point near the idler pulley 103, as shown in Fig. VI.

The pulley 105, is driven through bevel gears 107, from the main drive shaft 108, which extends longitudinally of the machine and is common to both sections thereof. Power is transmitted to this shaft through a train of gears 109, from a stub shaft 110, upon which the tight and loose pulleys 112, and 113, are mounted.

The cards fed to the conveyer are advanced thereby until arrested by the stop pins 115, (see Figs. III, and XIV), which are adjustably mounted in the ends of arms 116, and adapted to protrude within the spaces between the bands comprised by the conveyer 60, as shown in Fig. I. The arms 116, are fixed upon a rock shaft 117, which is actuated through a roller arm 118, by a cam 119, fixed upon a counter-shaft 120, driven by means of bevel gears 121, from the main driving shaft 108. The cam 119, is so timed with relation to the other working parts of the machine that the traverse of the card is temporarily arrested to permit the affixing of the sample notwithstanding its frictional contact with the conveyer.

This temporary stopping position for the cards is directly in the transverse path along which the samples are fed from a charging table 125, (see Figs. I, II, and IV), superimposed above an intermittently operated endless feed belt 126, which is sufficiently exposed through an opening 127, in the table 125, to permit an operative to properly place the samples one by one upon the said belt under the guidance of an adjustable gage 128. This gage consists of two parts, viz:—a bracket 129, which may be adjusted laterally with respect to the belt by reason of a slot 130, through which the clamping bolt 131, passes, and a slide piece 132, having a lateral extension 133, which may be adjusted longitudinally with respect to the belt 126, within the confines of a slot 134, through which a clamping bolt 135 passes.

The belt 126, is an endless one, passing about a pair of pulleys 136, and 137, of which the former is the driver, the proper driving contact being maintained by the slack take-up roller 138. As previously stated, the belt 126, is adapted to be intermittently shifted, and this motion is effected by a ratchet wheel 140, mounted on the shaft 141, with the pulley 136, under the action of a pawl 142, carried upon the end of an oscillating arm 143, freely fulcrumed about the shaft 141. This arm 143, is extended below its fulcrum to afford attachment for a link 145, by which it is operatively connected to one end of a rocking lever 146, pivotally mounted at 147, to a lug projecting from the bed plate 100, see Fig. IV. The other end of the lever 146, is slotted as indicated at 148, for the reception of a coöperating stud 149, on a transfer carriage 150, adapted to travel forward and backward in line with the sample feed belt and transversely across the card conveyer, so that for each reciprocation of the carriage, the feed belt 126, is shifted forward a distance corresponding to the spacing of the samples shown in Figs. I and II.

The carriage is functional in supporting the devices by which the samples are transferred one by one, from the sample feed belt to the cards which are temporarily arrested upon their conveyer, as previously stated. To this end, the carriage is provided with supporting rollers 151, which are guided in suitable tracks 152, mounted upon the superstructure 153. As seen in Fig. IV, the tracks are interrupted to afford a passageway for the card conveyer 60.

Mounted upon the carriage with provision for a slight amount of vertical play, is a suction pad 155, which is in the form of a shallow hollow rectangular structure whose bottom is provided with a series of edge perforations 156, by reason of which the sample is sucked up from the feed belt and advanced, through the motion of the carriage, to a position directly above the arrested card, whereupon the suction is released in a manner to be later described, and air under pressure substituted, whereby the sample is forcibly deposited upon the card. The carriage stops in a predetermined position relative to the arrested card and therefore the sample will be properly positioned upon said card.

At each end of its travel, the suction pad 155, is slightly depressed so as to be moved into close proximity first with the sample upon the belt 126, and secondly to the card to which the sample is to be affixed, while during the traverse of the carriage the pad is maintained in the raised position shown in Fig. V. To this end, the pad is suspended from a bridging strip 157, which is adjustably secured by means of bolts 158, to the cross bars 159, of a frame 160, which is guided for vertical reciprocation by means of the pins 161, set in and projecting upwardly from the carriage. At its center, the frame 160, is provided with a roller 162, which through the instrumentality of an interposed pivotally mounted equalizing bar 163, is affected by the action of a cam 164, fixed upon a rock shaft 165, which is journaled in brackets 166, projecting from the carriage. I have employed the term "equalizer" in connection with the pivoted bar 163, as indicative of the function thereof since through its interposition between the cam 164, and the roller 162, an equal motion is distributed throughout the frame 160, thereby obviating the tendency of any binding about the guide pins 161. Coiled springs 167, encircle these guide pins and serve to normally retain the frame 160, in its upper position and are further functional in maintaining the roller 162, in contact with its actuating parts.

The suction pad 155, communicates, by means of a flexible tube 168, with a three-way valve 170, which is connected at one side, with a pipe 171, which leads to a vacuum pump or any other convenient source of suction, not shown, and at the other end, with a supply pipe 172, for compressed air. The operation of the valve 170, is controlled by a cam 173, mounted upon the main drive shaft 108, and which through a roller arm 175, effects the motion of a lever 176, fulcrumed at 177, to the bed plate 100, and connected at its other end by means of a link 178, with the operating arm 179, of the valve. The cam 173, is so timed with respect to the motion of the carriage, that suction is applied to the pad 155, when the carriage is in its retracted position to receive the sample, and maintained during its forward motion to hold the sample, and control the substitution of air under pressure at the forward limit of the carriage, when the sample is forcibly deposited upon the card.

In addition to its traversing movement, it is necessary for the carriage 150, to dwell at either end of its travel to permit a sufficient time period to perform the functions above noted. The mechanism for controlling these movements of the carriage will be best understood by reference to Figs. I, V, and X to XIII inclusive.

To the side of the carriage is attached a rack bar 180, which is rectangular in outline and provided about its entire perimeter with gear teeth adapted to mesh with those of a pinion 181, mounted on the end of a shaft 182. This shaft is capable of angular movement by reason of a universal connection 183, with the pulley shaft 110, already described (see Fig. III). Near its outer end the shaft is journaled in a slide block 185, which is guided for vertical motion in a slide way 186, formed in a bracket 187, comprised by a bridge piece 188, which extends over the card conveyer and finds its support in a pressure table 189, the function of which will be later described. It will be noted that the continuous rotation of the pinion 181, causes the movement of the rack bar 180, first in one direction by engaging the teeth on the top of the bar and secondly in the other direction by engaging the teeth at the bottom of the bar, while the teeth on the shorter sides of the rectangle serve to effect the dwell above referred to.

In order to maintain the pinion 181, in contact with both the upper and lower teeth of the rack, I have provided springs 190, and 191, which during a portion of the movement of the journal block 185, in either direction bear against the same, but become neutral at the middle of this movement.

In order to counteract the tendency of the displacement of the transfer carriage under the influence of the springs 190, and 191, rollers 192, have been mounted upon the side of the bridge piece 188, and serve to engage the top of a ledge 193, formed on the carriage.

The pinion 181, is maintained in contact with the ends of the rack 180, by means of the spring-pressed plungers 195, and 196, slidably supported in suitable housings comprised by the superstructure 153, one of them being effective when the carriage is at one end of its traverse while the other becomes effective when the carriage has reached its limit of motion in the opposite direction.

The rocking of the shaft 165, which effects the depression of the suction pad 155, is brought about by the vertical movement of the sliding journal block 185, for the shaft 182. At the side of this block is formed a vertical rack 197, which engages a pinion 198, mounted upon the side of the bridge piece 188. This pinion meshes with a similar pinion 199, fast to a shaft 200, which projects through the bridge piece and upon the opposite side thereof carries a drive pinion 201, which effects the movement of a slide bar 202. This slide bar is slotted at 203, and 204, and is guided in its motion by the screws 205. The reciprocation of the journal block 185, is thus translated to the slide bar 202, in a horizontal direction so that at either end of the traverse of the carriage, a rocking of the shaft 206, is effected by means of the lugs 207, and 208, formed on the bar 202. These lugs are adapted to engage a pin 209, in the end of a lever 210, fast to the shaft 206, thereby causing the oscillation of an arm 211, which is connected by means of a link 212, to a similar arm 213, upon the rock shaft 165, of the controlling cam for the depression of the suction pad 155.

After the sample has been deposited upon the card, the stop fingers 115, are retracted, whereupon the conveyer 60, again becomes effective in further advancing the card over the pressure table 189, upon the top of which the belt is supported through a portion of its path.

Located directly adjacent the bridge piece 188, is a heated pressure roller 216, which is journaled in the ends of arms 217, pivotally secured at 218, to the pressure table. This roller rests by gravity upon the top of the conveyer so that the card is advanced beneath the same thereby firmly pressing the sample against the same to insure adhesion thereto and causing the glue to set sufficiently to prevent the separation of the sample and card in its further traverse through the machine. Heat may be supplied to the pressure roller electrically by the conductors conventionally indicated at 219, in Fig. I. After leaving the pressure rollers, the card and its affixed sample is further advanced by the conveyer and delivered to the stacking mechanism which will now be described.

3. Stacking mechanism.

The moving parts of this portion of the machine are mounted in the end standards 102, and comprise a receiving table 220, which is adapted for vertical movement under the propulsion of the feed screws 221, which are simultaneously and intermittently rotated with the screws 7, and 8, of the card feeding mechanism by means of the sprocket chain 17. It will be noted that the screws 221, are left hand, and therefore are effective in moving the table 220, downward, that is in a direction opposite to that of the feed table 6, for the cards. Also by reason of the smaller sprockets which they carry, the feed screws 221, are effective in moving the table an increment preferably about twice that of the card feed table 6, thereby allowing for the additional thickness of the sample. By means of a hand wheel 222, and by reason of the sprocket chain connection, this system of feed screws may be simultaneously manually operated to restore the tables to starting position after they have been fully advanced to limits of their motion in their active directions, it being necessary only to temporarily disengage the pawl 15, from its ratchet.

The cards are received from the conveyer upon a stripper 225, whose arms 226, normally rest tangentially against the pulley 105, the strips 227, preventing further motion of the card under the influence of the conveyer. (See Figs. I, and XV.) The stripper arms 226, are fixed upon the shaft 228, journaled in the end frames 102, and actuated by means of a fixed pinion 229, which meshes with a rack bar 230, at the end of a link 231, see also Fig. III. The other end of this link 231, is pivotally attached to an arm 232, fixed to one end of a counter shaft 233, to the other end of which is secured a second arm 234. The arm 234, carries a roller engaged by a groove cam 235, mounted on the main driving shaft 108, and thereby effects the oscillation of the countershaft 233, which through the intermediate connections already described causes the reciprocation of the rack 230. The extent of the motion rack is sufficient to cause substantially a semi-rotation of the shaft 228, so that the cards are delivered to the receiving table and stacked in inverted position and are therefore ready for disposal.

The operation of my improved machine will be apparent from the above description. I will, however, refer in a general way to the coöperative action of the various mechanisms. The cards, to which the samples are to be applied, are placed in the stack holder at the receiving end of the machine, and this is adjusted to bring the top of the stack into proper coöperative relation with the vacuum pad, which removes the cards from the stack, and to the printing pad, which applies the adhesive to the cards in the stack. The printing bar and the vacuum pad descend substantially together; the adhesive being applied to the cards, and on the upward movement of the vacuum pad, or pads, when a plurality are used, the cards are stripped from the retainers in the stack holder. The printing bar has a greater upward movement than the vacuum pad so that this moves out of the way of the card and permits the vacuum pad to move forward to present the card to the continuously traveling conveyer. On the forward and backward movement of the vacuum pad, the printing bar comes in contact with the roll running in the adhesive trough and a new supply of adhesive is placed on the printing bar. The cards, after being placed on the traveling conveyer, are carried along until the station is reached where the samples are to be applied. It is to be noted that, while the cards may be placed in any timing on the conveyer, these conveyer fingers which arrest the card hold it in a predetermined position for receiving the sample. The samples are fed by hand onto the conveyer belt therefor. The conveyer belt is driven intermittently and the sample is placed on the belt when it is at rest. This predetermines the position of the sample relative to the travel of the conveyer therefor. The reciprocating carriage moves over the sample on the conveyer belt and is depressed a certain distance, after which the suction lifts the sample against the carriage. The carriage at this time is at a dwell so that the sample is placed in predetermined position on the carriage. The carriage then moves laterally across the traveling conveyer for the cards and comes to a rest at the other end of its stroke so that the sample is then placed in a predetermined position over the card. The holder for the sample moves downwardly to a certain extent and air pressure strips the sample from the carriage and places the same on the card in proper position. The retaining fingers are then withdrawn and the conveyer carries the card underneath the pressing roller which presses the sample on the card and finally affixes the sample to the card. The cards are stripped from the conveyer by the stripping fingers and are placed one after another onto the receiving table and thus restacked. The receiving table has a downward movement as the stack is formed.

From the above description, it will be apparent that I have provided a machine for securing samples to cards wherein cards are automatically taken from the stack, the samples automatically positioned and fixed to the cards, after which the cards are automatically restacked.

It is obvious that minor changes in the details of the construction and arrangement of parts may be made without departing from the spirit of the invention as set forth in the appended claims.

Having thus described my invention I claim:

1. In a machine of the class described, the combination of horizontally disposed card-feeding means, means for affixing adhesive to the card and for delivering the card with adhesive thereon to the feeding means, means for feeding a sample, means for superposing said sample on said card while horizontally disposed and in predetermined relation thereto, means for pressing the sample against said adhesive, and means for stacking the cards with the samples attached thereto.

2. In a machine of the class described, the combination of horizontally disposed card feeding means, means for affixing adhesive to the card and for delivering the card with adhesive thereon to the feeding means, means for feeding a sample, means for superposing said sample on said card while horizontally disposed and in predetermined relation thereto, and means for pressing the sample against said adhesive.

3. In a machine of the class described, the combination of horizontally disposed card feeding means, a stack holder for the cards, means for applying an adhesive to the cards while in the holder, means for presenting the cards one after another to the card feeding means, means for superposing a sample on the card against said adhesive, and means for restacking the cards with the samples attached thereto.

4. In a machine of the class described, the combination of horizontally disposed card feeding means, a stack holder for the cards, means for applying an adhesive to the cards while in the holder, means for presenting the cards one after another to the card feeding means, means for feeding samples in predetermined timed relation to the feeding of the cards, and means for superposing a sample on a card while horizontally disposed and against the adhesive thereon.

5. In a machine of the class described, the combination of horizontally disposed card feeding means, a stack holder for the cards, means for applying an adhesive to the cards while in the holder, means for presenting the cards having adhesive thereon one after another to the card feeding means, means for feeding samples in predetermined timed relation to the feeding of the cards, means for superposing a sample on a card while horizontally disposed and against the adhesive thereon, and means for pressing the sample against the card.

6. In a machine of the class described, the combination of horizontally disposed card feeding means, a stack holder for the cards, means for applying an adhesive to the cards while in the holder, means for presenting the cards one after another to the card feeding means, means for feeding samples in predetermined timed relation to the feeding of the cards, means for superposing a sample on a card horizontally disposed and against the adhesive thereon, means for pressing the sample against the card, and means for restacking the cards with the samples attached thereto.

7. In a machine of the class described, the combination of a continuously moving conveyer, means for feeding cards to said conveyer, means for temporarily arresting a card while on said conveyer, sample feeding means, a reciprocating carriage adapted to engage a sample on said sample feeding means to transfer it to a position above said card while temporarily arrested and to release it in said position.

8. In a machine of the class described, the combination of a continuously traveling conveyer for feeding cards, means for temporarily arresting a card while on said conveyer, means for applying an adhesive to the card and for presenting the same to the conveyer, an intermittent traveling conveyer arranged at an angle to the first-named conveyer for feeding samples, and means for transferring the samples from the conveyer therefor to the cards while said cards are arrested.

9. In a machine of the class described, the combination of a continuously traveling conveyer for feeding cards, means for temporarily arresting a card while on said conveyer, means for applying an adhesive to the card and for presenting the same to the conveyer, an intermittent traveling conveyer arranged at an angle to the first-named conveyer for feeding samples, means for transferring the samples from the conveyer therefor to the cards while said cards are arrested, and means for pressing the sample against the adhesive on the card.

10. In a machine of the class described, the combination of a continuously traveling conveyer for feeding cards, means for temporarily arresting a card while on said conveyer, means for applying an adhesive to the card and for presenting the same to the conveyer, an intermittent traveling conveyer arranged at an angle to the first-named conveyer for feeding samples, means for transferring the samples from the conveyer therefor to the cards while said cards are arrested, means for pressing the sample against the adhesive on the card, and means for restacking the cards with the samples attached thereto.

11. In a machine of the class described, a stack holder for cards, means for applying adhesive to the cards while in the stack holder, a conveyer for feeding the cards, means for presenting the cards with the adhesive thereon one at a time to the conveyer from said stack holder, means for supporting the stack holder and for raising the same for maintaining the upper card of the stack constantly on the same level, and means for applying samples to the cards on the conveyer.

12. In a machine of the class described, a stack holder for cards, a conveyer for feeding the cards, means for presenting the cards one at a time to the conveyer from said stack holder, means for supporting the stack holder and for raising the same for maintaining the upper card of the stack constantly on the same level, means for applying an adhesive to the card while in the stack, and means for applying a sample to the card while on said conveyer.

13. In a machine of the class described, a stack holder for cards, a conveyer for feeding the cards, means for presenting the cards one at a time to the conveyer from said stack holder, means for supporting the stack holder and for raising the same for maintaining the upper card of the stack constantly on the same level, means for applying an adhesive to the card while in the stack, means for applying a sample to the card while on said conveyer, and means for restacking the cards with the samples attached thereto.

14. In a machine of the class described, a stack holder for cards, means for maintaining the upper card of the stack constantly on the same level, means for applying an adhesive to the card in the stack, a continuous conveyer, means for shifting the cards from the stack to the conveyer, and means for applying a sample to the card while on the conveyer.

15. In a machine of the class described, a stack holder for cards, means for maintaining the upper card of the stack constantly on the same level, means for applying an adhesive to the card in the stack, a continuous conveyer, means for shifting the cards from the stack to the conveyer, means for applying a sample to the card while on the conveyer, means for pressing the sample against the adhesive on the card while on the conveyer, and means for restacking the cards with the samples attached thereto.

16. In a machine of the class described, the combination of means for holding a stack of cards, means for maintaining the upper card of the stack constantly on the same level, a continuous conveyer, a vacuum pad, means for operating the same for shifting the uppermost card of the stack from the stack to the conveyer, and means for applying samples to the cards while on the conveyer.

17. In a machine of the class described, the combination of means for holding a stack of cards, means for maintaining the upper card of the stack constantly on the same level, a continuous conveyer, means for applying adhesive to a portion of the uppermost card in the stack, means arranged to shift the uppermost card from the stack to the conveyer, including a vacuum pad adapted to engage the card at the time the adhesive is being applied, and means for applying a sample to the adhesive on the card while on the conveyer.

18. In a machine of the class described, means for holding a stack of cards, means for removing the cards from the stack one at a time, means for applying samples to the cards, and means for separating the uppermost card from the stack including a compressed air jet located on opposite sides of the stack and directed so as to impinge between the two upper cards of the stack whereby the two upper cards are separated.

19. In a machine of the class described, means for holding a stack of cards, means for removing the cards from the stack one at a time, means for applying samples to the cards, means for separating the uppermost card from the stack, including a compressed air jet located on opposite sides of the stack and directed so as to impinge between the upper cards of the stack, whereby the upper cards are separated, and means for preventing the displacement of the separated cards.

20. In a machine of the class described, the combination of a conveyer, means for feeding cards one at a time from a stack to said conveyer, a vertically reciprocating printing bar adapted to impress an imprint of adhesive upon the uppermost card of the stack, a coöperating glue supply roller adapted to be reciprocated beneath the said bar to effect a wiping contact therewith while the said bar is in its elevated or idle position, a glue trough for the said roller, means for intermittently rotating the said roller, and means for applying a sample to the said card.

21. In a machine of the class described, the combination of a conveyer, means for feeding cards one at a time to said conveyer, including means for affixing an imprint of adhesive to the said cards, means for temporarily arresting the cards upon the said conveyer, sample feeding means including an intermittently operated feed belt, a reciprocating carriage for transferring the sample from the said feed belt to the arrested card upon the said conveyer, a suction pad mounted upon said carriage and adapted to lift the sample from the feed belt and hold the same during the forward movement of the said carriage, and means for releasing the suction to permit the deposit of the sample upon the said card.

22. In a machine of the class described, the combination of a conveyer, means for feeding cards one at a time to said conveyer, means for affixing an imprint of adhesive to the cards, means for temporarily arresting the cards upon the said conveyer, sample feeding means including an intermittently operated feed belt, a carriage for transferring the sample from the said belt and delivering the same to the arrested card upon the said conveyer, means for reciprocating the said carriage and for giving a dwell thereto at each end of its stroke to permit the picking up and discharge of the sample.

23. In a machine of the class described, the combination of means for feeding a card, means for affixing an imprint of adhesive to the card, means for feeding a sample, a carriage for transferring the sample from its feeding means and for applying the same in a predetermined position on the card, means for reciprocating said carriage and for giving a dwell thereto at each end of its stroke to permit the picking up and the discharge of the sample.

24. In a machine of the class described, the combination of a conveyer, means for feeding cards one at a time to said conveyer, means for affixing an imprint of adhesive to the cards, means for temporarily arresting the cards upon the said conveyer, sample feeding means including an intermittently operated feed belt, a carriage for transferring the sample from the said belt and delivering the same to the arrested card upon the said conveyer, means for reciprocating the said carriage and for giving a dwell thereto at each end of its stroke to permit the picking up and discharge of the sample, said reciprocating means including a rectangular rack secured to the said carriage and provided with perimetrical teeth, and a coöperating and constantly rotating toothed pinion for driving the said rack.

25. In a machine of the class described, the combination of means for feeding cards, means for affixing an imprint of adhesive to the cards, a sample feeding means including an intermittently operated feed belt, a carriage for transferring the sample from the said belt and superposing the same upon the card, means for reciprocating the said carriage and for giving a dwell thereto at the end of its stroke to permit the picking up and discharge of the sample, said reciprocating means including a rectangular rack secured to the said carriage and provided with perimetrical teeth, a constantly rotating toothed pinion for driving the said rack, and means for yieldingly maintaining the engagement between the said pinion and rack.

26. In a machine of the class described, the combination of means for feeding cards, means for affixing an imprint of adhesive to the said cards, a sample feeding means including an intermittently operated feed belt, a reciprocating carriage for transferring the sample from the said feed belt to the card, a suction pad mounted upon said carriage and adapted to lift the sample from the feed belt and hold the same during the forward movement of the said carriage, means for releasing the suction to permit the deposit of the sample upon the said card, and means for depressing the said pad at the end of each stroke of reciprocation to facilitate the lifting and depositing of the samples.

27. In a machine of the class described, the combination of means for feeding cards, means for affixing an imprint of adhesive to the said cards, a sample feeding means including an intermittently operated feed belt, a reciprocating carriage for transferring the sample from the said feed belt to the card, a suction pad mounted upon said carriage and adapted to lift the sample from the feed belt and hold the same during the forward movement of the said carriage, and means for releasing the suction and substituting air under pressure to effect the depositing of the sample upon the card at the end of the forward motion of the said carriage.

28. In a machine of the class described, the combination of means for feeding cards one at a time from a stack, a continuously moving conveyer, a table for the card stack, means for raising the said table to maintain the upper card of the stack constantly on the same level, means for applying samples to the cards, while upon the said conveyer, a receiving table, means for stripping the cards with the samples applied thereto from the said conveyer and delivering the same to the said receiving table, and means for lowering the said receiving table to permit the cards to be stacked thereon.

29. In a machine of the class described, a stack holder for cards, including a feeding table for supporting the stack, means for raising the table to maintain the upper card of the stack constantly at the same level, means for feeding cards one at a time from the stack, means for applying samples to the cards, a receiving table, means for delivering the cards with the samples applied thereto to the receiving table, and means for lowering the receiving table to permit the cards to be stacked thereon, said lowering means being connected with said raising means, so that said receiving table is lowered as said feeding table is raised.

30. In a machine of the class described, a stack holder for cards, including a feeding table for supporting the stack, means for raising the table to maintain the upper card of the stack constantly at the same level including a screw, means for feeding cards one at a time from the stack, means for supplying samples to the cards, a receiving table, means for delivering the cards with the samples applied thereto to the receiving table, and means for lowering the receiving table to permit the cards to be stacked thereon, also including a screw, a sprocket wheel connected with each of said screws, and a chain connecting said sprocket wheels, whereby said receiving table is lowered as said feeding table is raised.

31. In a machine of the class described, the combination of means for feeding cards one at a time from a stack to a conveyer, including a table for the said stack, a screw engaging the said table, means for intermittently rotating the said screw to maintain the upper card of the stack constantly on the same level, means for applying a sample to the cards while upon the said conveyer, a receiving table, means for stripping the cards from the said conveyer and delivering the same to the said receiving table, a screw engaging said receiving table, geared connections between the screw for the feed table, and the screw for the receiving table whereby both tables may be simultaneously operated, the gear ratio being such as to retract the said receiving table in increments in excess of those of the feed table, to allow for the additional thickness of the samples.

32. In a machine of the class described, the combination of a conveyer, means for feeding cards to said conveyer, means for affixing an imprint of adhesive to the cards, means for feeding samples to the cards while upon the said conveyer, a pressure table interposed in the path of the said conveyer for supporting the same, and a heated pressure roller coöperating with the said table to press the samples against the cards.

In testimony whereof I have hereunto signed my name, at Philadelphia, Pennsylvania, this sixteenth day of November, 1915.

MARION H. CLARK.

Witnesses:
 HENRY HOWARD ELLISON,
 ALBERT T. BAUERLE.

Copies of this patent may be obtained for five cents each, by addressing the "Commissioner of Patents, Washington, D. C."